US005657001A

United States Patent [19]
Wilson

[11] Patent Number: 5,657,001
[45] Date of Patent: Aug. 12, 1997

[54] FLUID FLOW DETECTOR

[75] Inventor: Alan T. Wilson, Broken Arrow, Okla.

[73] Assignee: Oklahoma Safety Equipment Company, Broken Arrow, Okla.

[21] Appl. No.: 633,285

[22] Filed: Apr. 16, 1996

[51] Int. Cl.$^6$ .............................. G08B 21/00; B65D 90/36
[52] U.S. Cl. .......................... 340/611; 340/626; 340/652; 200/61.08; 220/89.2
[58] Field of Search ...................... 340/606, 610, 340/590, 652, 626, 611; 200/61.08; 137/68.1; 220/89.1, 89.2

[56] References Cited

U.S. PATENT DOCUMENTS

| | | | |
|---|---|---|---|
| 2,194,159 | 6/1940 | Bonyun et al. | 220/89.2 |
| 2,922,544 | 2/1960 | Hibbard et al. | 220/89.2 |
| 3,091,359 | 5/1963 | Wood | 220/89.2 |
| 3,484,817 | 12/1969 | Wood | 220/89.2 |
| 4,263,929 | 4/1981 | Kearney | 137/68 R |
| 4,342,988 | 8/1982 | Thompson et al. | 340/679 |
| 4,597,505 | 7/1986 | Mozley et al. | 220/89.2 |
| 4,698,623 | 10/1987 | Smith | 340/665 |
| 4,978,947 | 12/1990 | Finnegan | 340/611 |
| 5,155,471 | 10/1992 | Ellis et al. | 340/611 |
| 5,313,194 | 5/1994 | Varos | 340/626 |
| 5,378,864 | 1/1995 | Olivier et al. | 200/61.08 |

FOREIGN PATENT DOCUMENTS

| | | | |
|---|---|---|---|
| 2052958 | 6/1980 | United Kingdom | 137/68.1 |
| 2100349 | 6/1982 | United Kingdom | 137/68.1 |
| 2220032 | 12/1988 | United Kingdom | 137/68.1 |

*Primary Examiner*—Brent A. Swarthout
*Assistant Examiner*—Van T. Trieu
*Attorney, Agent, or Firm*—Jones, Day, Reavis & Pogue

[57] ABSTRACT

A sensor body has an orifice forming a central fluid flow passage therethrough and supports a thin conducting frangible rod, such as graphite, across the central fluid flow passage. The graphite rod and connectors are insulated from the body when the body is made from a conducting material such as metal. When the graphite rod is broken by fluid flow, a circuit is broken and an alarm condition is created.

15 Claims, 1 Drawing Sheet

FLUID FLOW DETECTOR

BACKGROUND OF THE INVENTION

1. Field of the Invention

The present invention relates in general to fluid flow detectors and in particular to a reliable, low cost, disposable sensor for automated plastic extrusion systems in which an alarm is given if a rupture disk fails and liquified plastic flows through the pressure relief piping.

2. Description of Related Art Including Information Disclosed Under 37 CFR 1.97 and 1.98

There are many different types of rupture disk assemblies or safety pressure relief devices that are used as protective devices on tanks, receptacles, or conduits in which excessive fluid pressure may develop. They are designed to burst under a predetermined pressure. A few of the representative types of such assemblies are disclosed in U.S. Pat. Nos. 2,922,544, 2,194,159, 3,091,359, 3,484,817, and 4,597,505.

In automated plastic extrusion systems, a sensor is needed to shut down the system in the event of rupture disk failure. Such sensors that are presently used are not only large in size and weight but are very expensive. Yet it is very important to detect when pressure has raptured a disk and plastic is flowing out of the system as waste.

It would be desirable to have a reliable, low cost, disposable sensor for such plastic extruders.

SUMMARY OF THE INVENTION

The present invention overcomes the disadvantages of the prior art by providing such a reliable, low cost, disposable sensor for plastic extruders. It has a very compact size and is light in weight and economical to produce.

It has a sensor body with an orifice forming a central flow passage through the longitudinal center thereof with internal threads on one end so that it can be attached to pressure relief piping connected downstream of the plastic extruder burst disk. A thin graphite rod is supported across the central flow passage or orifice. Wire leads are connected through miniature connectors to each end of the graphite rod and are coupled to a closed path alarm circuit. When the burst disk ruptures and plastic flows out from the extruder, it flows through the central flow passage or orifice in the sensor body and breaks the graphite rod. The circuit is then broken and an alarm condition is created. The resulting signal may be used to shut down the automatic extrusion system.

Generally, the plastic from the extrusion system is sufficiently viscous that it alone will break the graphite rod and create the alarm condition. However, in other systems using fluids that are much less viscous or fluids other than plastic, an optional piston may be used in the flow passageway that has a projection extending from one end thereof with an orifice through the projection and through which the graphite rod can be inserted. Thus the piston depends from the graphite rod but is supported by the internal surface of the orifice or flow passageway. Thus less viscous fluids, upon contacting the piston, will generate sufficient pressure to break the graphite rod and create the resulting alarm signal.

The sensor is constructed of a lower body portion having a first outside diameter and a second integrally formed upper portion having a smaller diameter. It also has an annular cap that matingly surrounds, and is attached to, the upper second body portion for receiving electrical conductors. A central flow passageway extends through both the first and second body portions. Orifices in each side wall of the second upper body portion having the smaller diameter receives miniature connectors to which the electrical conductors or wire leads are attached. A graphite rod is inserted through one miniature connector and extended diametrically across the flow passageway to, and is inserted in, the other miniature connector. The miniature connectors may be constructed such as to have a resilient arm extending from one diameter of the miniature connector to the opposed bottom inside diameter. When a graphite rod is inserted in the miniature connector, it slides under the resilient arm forcing it upwardly thereby creating a tension on the graphite rod to hold it in place.

The sensor body may be PVC or other plastic. It also may be made of metal. However, in such case, the connectors extending through the walls of the smaller diameter portion of the body must be insulated therefrom.

The primary application of the present invention is to detect the flow of viscous material such as plastic. In such case, the graphite rod only can be used. However, it can be used in detecting less viscous flowable materials by the use of the optional piston. It should also be understood that different diameter graphite rods can be used for fluids of different viscosity.

Thus it is an object of the present invention to provide a reliable, low cost, disposable graphite rod fluid flow sensor.

It is also an object of the present invention to provide a disposable sensor for detecting plastic flow from automated plastic extrusion systems.

It is yet another object of the present invention to provide a reliable, low cost, disposable sensor that utilizes graphite rods of different diameter that will rupture at predetermined pressures caused by different fluid viscosities and flow rates.

It is also an object of the present invention to provide a sensor for a fluid flow system to be used as a leak detector and which utilizes a piston in a fluid flow path that is attached to a graphite rod extending across the fluid flow path to cause the graphite rod to break under predetermined flow rates and pressures against the piston and thus sound an alarm.

Thus the present invention relates to a fluid flow detector comprising an enclosed tube having side walls for carrying fluid in a fluid flow path; electrical terminals mounted on each side wall of the tube and a frangible electrically conductive frangible rod such as graphite extending across the fluid flow path and connecting the electrical terminals to complete an electrical circuit, the electrical circuit being broken and causing an alarm to be sounded when fluid flow in the tube breaks the graphite rod.

The invention also relates to a method of detecting fluid flow in an enclosed path and providing an electrical indication thereof comprising the steps of placing an electrically conductive frangible rod across the enclosed fluid flow path that will break under a predetermined pressure of fluid flowing in the enclosed path, coupling an electrical circuit to each end of the frangible rod, and generating a signal when fluid flow pressure in the enclosed path is sufficient to break the frangible rod.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which.

DETAILED DESCRIPTION OF THE PREFERRED EMBODIMENTS

Figure 1:
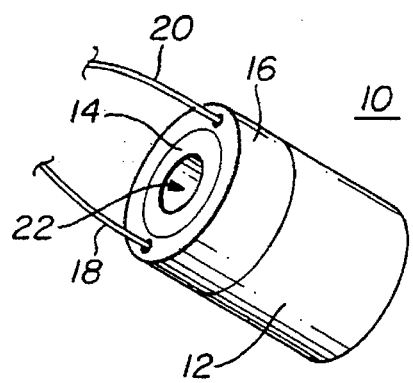
FIG. 1 is an isometric view of the sensor of the present invention.

FIG. 1 is an isometric view of the novel fluid flow sensor of the present invention. The sensor 10 has a first body portion 12 having a first diameter and a second body portion 14 having a smaller outside diameter, the first and second body portions being integrally formed as one unit. A cap 16 has the same outer diameter as the first body portion 12 and an inside diameter such that it encircles the second body portion 14 having the smaller diameter. Electrical connections 18 and 20 extend outwardly from the cap or cover 16. An orifice 22 forms a fluid flow passageway that extends longitudinally through the sensor 10 including both the first portion 12 having the larger diameter and the second portion 14 having the smaller diameter.

Figure 2:
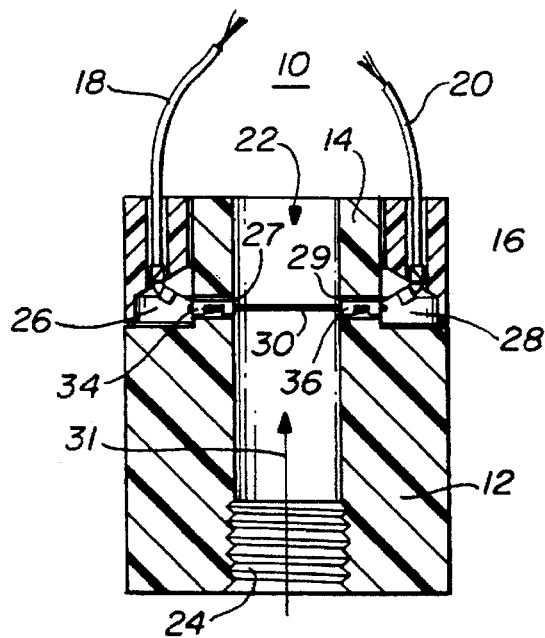
FIG. 2 is a cross-sectional view of a first embodiment of the sensor in FIG. 1.

FIG. 2 is a longitudinal cross-sectional view of a first embodiment of the novel sensor 10 shown in FIG. 1. As can be seen in FIG. 2, the orifice 22 that extends through both the larger diameter body portion 12 and the smaller diameter body portion 14 is internally threaded at one end 24 so that it can be threadedly attached to a fluid flow pipe. The sensor 10, of course, can be of any size required but for typical automated plastic extrusion systems need be only an inch to an inch-and-a-half in outer diameter. As can be seen in FIG. 2, the electrical wires 18 and 20 extend downwardly through the cap 16 and connect to connectors 26 and 28 on each side of the smaller diameter body portion 14. A portion 34 and 36 of the connectors 26 and 28 are actually positioned in the side walls of the body portion 14 having the smaller diameter. A graphite rod 30 is inserted in one of the connector portions 34 (or 36) and is extended across the fluid flow path or orifice 22 to make contact with and be inserted in the other connector 36 (or 34) so that the graphite rod 30 extends across the fluid flow path, which fluid flows in the direction indicated by arrow 31. With a highly viscous fluid such as plastic, any such flow in fluid flow passageway 22 will, when contacting graphite rod 30, cause it to break, thus creating an alarm signal for electrical leads 18 and 20 that are connected to a well-known alarm circuit (not shown). The graphite sensor rod 30 may be, for example, of a diameter of 0.5 mm. Of course, that diameter can vary depending upon the fluid flow pressure and rate and the predetermined pressure and flow rate at which it is desired to detect the fluid flow.

Figure 3:
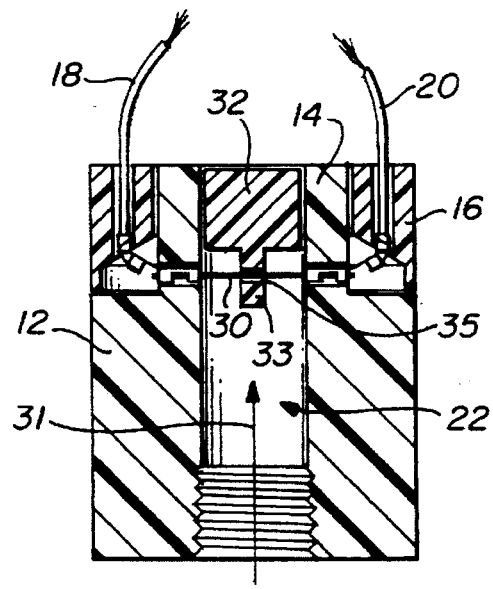
FIG. 3 is a cross-sectional view of a second embodiment of the sensor in FIG. 1.

FIG. 3 discloses a cross section of a second embodiment which is used to detect fluid flow of much less viscous fluids than plastic. In this case, a piston 32 has a projection 33 extending from one end thereof with an orifice 35 therein. The graphite rod 30 which extends between the connectors 34 and 36 is passed through the orifice 35 such that the piston 32 depends from the graphite rod 30. In such case, as will be readily understood by those skilled in the art, the piston 32, substantially blocking the fluid flow path 22 will have a pressure applied to it by any fluid in the fluid flow passageway 22 thus causing the piston 32 to break the frangible graphite rod 30 and create an alarm signal.

Figure 4:
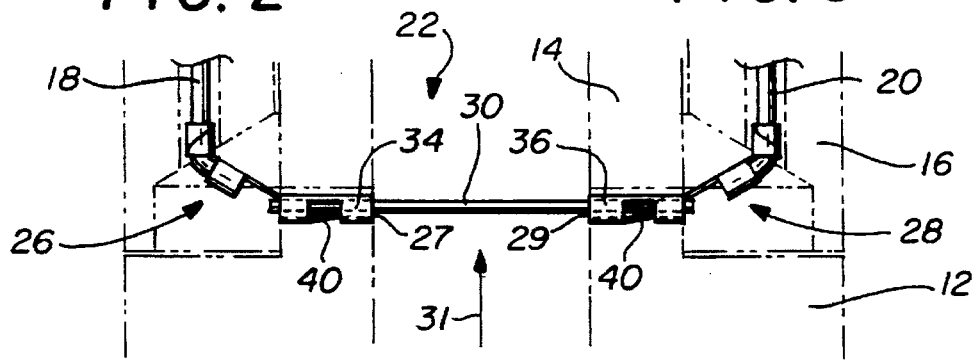
FIG. 4 is an enlarged detailed view of the electrical connectors holding the graphite rod across the fluid flow path.

FIG. 4 is an enlarged view of the electrical connectors 26 and 28 and their relationship to the cap or cover 16 and the walls of the smaller diameter body portion 14. It will be noted that portions 34 and 36 of the connectors 26 and 28, respectively, extend through orifices 27 and 29 in the walls of the smaller diameter body portion 14. It will also be noted that a resilient arm 40 in each of the connectors 34 and 36 tends to hold the frangible graphite rod 30 in place.

Figure 5A:
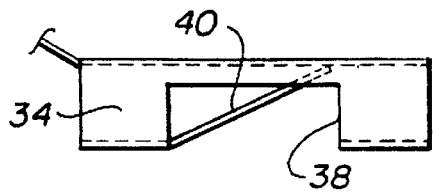
FIG. 5A is an enlarged view of a connector without the graphite rod inserted therein illustrating the resilient graphite rod gripping means.
Figure 5B:
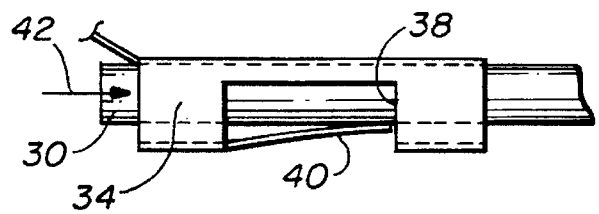
FIG. 5B is an enlarged view of the connector of FIG. 5A in which a graphite rod has been inserted to cause the resilient finger or arm to apply tension to the graphite rod to hold it in place.

FIG. 5A is an enlarged view of the connector 34 without the graphite rod inserted therein. Note that a resilient arm 40 is formed as a portion of one side of the connector 34 and extends across the connector 34 to the other side through open portion or slot 38 as shown. As can be seen in FIG. 5B, when the graphite or frangible rod 30 is inserted in the direction of arrow 42 into the connector 34, it forces the resilient arm 40 away from the other side wall and, because the arm 40 is resilient, it creates a pressure or force against rod 30 thus tending to hold it in place.

It will be understood, of course, that the cap portion 16 may be attached in any well known manner to and surrounding the smaller diameter body portion 14. It will also be understood that the sensor 10 may be formed of PVC or any other well-known plastic. It may also be formed of metal but, in such case, the connectors portions 26 and 28 must be electrically insulated from the body portion so as not to cause a defective circuit.

Further, the rod 30 can be any conductive material. Brittle or frangible conductors such as graphite compounds fracture and break. Ductile connectors such as stainless steel rods of the proper diameter, can bend and pull out of the connectors, thus breaking the connection.

Thus there has been disclosed a novel fluid flow sensor which has a frangible electrically conductive rod extending across a fluid flow path such that a predetermined flow pressure and flow rate can break the frangible rod and provide a signal to an electrical circuit coupled to the frangible rod through electrical connectors. The novel invention can be made of low cost plastic, is very reliable, fail safe, and is disposable. It can be threadedly attached to any fluid line directly or by means of adaptors. It includes a piston in one embodiment that substantially blocks the fluid passageway such that fluids that are much less viscous than plastic can build up sufficient pressure in the fluid flow path to break the frangible rod and provide an electrical signal.

In addition, the electrical connectors are formed such that a resilient arm contacts the frangible rod inserted in the connector to apply pressure thereto and tends to hold it within the connector.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A fluid flow detector comprising:
   a hollow body having side walls and a fluid passageway for carrying fluid in a fluid flow path;
   electrical terminals mounted on each side wall of said hollow body; and a frangible electrically conductive rod extending across the fluid flow path and connecting the electrical terminals to complete an electrical circuit, said electrical circuit being broken when fluid flow in the fluid passageway breaks the frangible rod.

2. A fluid flow detector as in claim 1 wherein:

said frangible rod is a graphite rod; and said graphite rod is selected in diameter so as to break at a predetermined flow rate of said fluid.

3. A fluid flow detector as in claim 1 wherein each of said electrical terminals comprises:

first and second ends;

an electrical connector attached to each of said first and second ends;

a cylindrical portion forming each of said first and second electrical connectors for receiving said frangible rod; and a frangible rod restraining device formed in at least one of said first and second cylindrical portions for applying a restraining force to said frangible rod inserted in said cylindrical portion to hold said frangible rod in said cylindrical portion.

4. A fluid flow detector as in claim 3 wherein said graphite rod restraining device comprises a flexible restraining arm having a first end attached to said cylindrical portion and a second end extending inside said cylindrical portion and resiliently biased across the path of the graphite rod such that a graphite rod inserted in said cylindrical portion will engage and be restrained from movement by said resiliently biased restraining arm.

5. A fluid flow detector as in claim 1 wherein said hollow body is formed of nonelectrically conductive material.

6. A fluid flow detector as in claim 5 wherein said nonelectrically conductive material is plastic.

7. A fluid flow detector as in claim 1 wherein:

said hollow body is metal; and said electrical terminals are electrically insulated from said hollow metal body.

8. A fluid flow detector as in claim 1 further comprising:

a piston slidably mounted in said hollow body at least partially blocking said fluid flow path, said piston having first and second ends; and a connector on one end of said piston for attachment to said frangible rod such that a fluid flow in said hollow body fluid passageway applies pressure to said piston to break said frangible rod and generate an electrical signal by said electrical circuit.

9. A fluid flow detector as in claim 8 wherein said connector on said piston comprises:

a projection extending outwardly from said one end of said piston; and an orifice in said projection for receiving said frangible rod such that said piston is suspended from said frangible rod.

10. A method of detecting fluid flow in an enclosed path and providing an electrical indication thereof comprising the steps of:

placing an electrically conductive frangible rod across the enclosed fluid flow path that will break under a predetermined pressure of fluid flowing in said enclosed path;

coupling an electrical circuit to each end of said frangible rod; and generating a signal when fluid flow pressure in said enclosed path is sufficient to break said frangible rod.

11. The method of claim 10 further including the step of selecting a graphite rod as the frangible rod.

12. The method of claim 11 further comprising the step of selecting a graphite rod having a diameter that will break under a predetermined fluid flow pressure in said enclosed path.

13. The method of claim 10 furrier comprising the steps of:

providing electrical terminals to receive each end of said graphite rod; and receiving and holding said graphite rod across said fluid path with resilient gripping means in each electrical terminal.

14. The method of claim 10 further comprising the steps of:

slidably mounting a piston in said enclosed fluid flow path to at least partially block said fluid flow path, said piston having first and second ends; and attaching said piston to said frangible rod with a connector such that a fluid flow in said enclosed fluid flow path applies pressure to said piston to break said frangible rod and generate an electrical signal by said electrical circuit.

15. The method of claim 14 wherein the step of attaching said piston to said frangible rod with a connector further comprises the steps of:

providing a projection that extends outwardly from said one end of said piston; and inserting said graphite rod through an orifice in said projection such that said piston depends from said frangible rod.

* * * * *